(12) United States Patent
White et al.

(10) Patent No.: US 10,495,122 B2
(45) Date of Patent: Dec. 3, 2019

(54) MODULAR INTERLOCKING DISPLAY SYSTEMS

(71) Applicants: Mel White, Milwaukie, OR (US); Kevin Carty, Milwaukie, OR (US); Khakim Burkhanov, Milwaukie, OR (US); Yevgeniy Ponomarenko, Milwaukie, OR (US)

(72) Inventors: Mel White, Milwaukie, OR (US); Kevin Carty, Milwaukie, OR (US); Khakim Burkhanov, Milwaukie, OR (US); Yevgeniy Ponomarenko, Milwaukie, OR (US)

( * ) Notice: Subject to any disclaimer, the term of this patent is extended or adjusted under 35 U.S.C. 154(b) by 0 days.

(21) Appl. No.: 15/393,111

(22) Filed: Dec. 28, 2016

(65) Prior Publication Data

US 2018/0180077 A1 Jun. 28, 2018

(51) Int. Cl.
*A47G 1/06* (2006.01)
*F16B 5/00* (2006.01)

(52) U.S. Cl.
CPC ............ *F16B 5/0032* (2013.01); *A47G 1/065* (2013.01)

(58) Field of Classification Search
CPC ...................................................... A47G 1/065
USPC .......................................... 40/729, 603, 605
See application file for complete search history.

(56) References Cited

U.S. PATENT DOCUMENTS

| | | | | | |
|---|---|---|---|---|---|
| 3,852,901 | A | * | 12/1974 | Woodle | G09F 15/0068 40/605 |
| 4,166,332 | A | * | 9/1979 | Donovan | G09F 19/18 160/135 |
| 4,545,142 | A | * | 10/1985 | Whisnant | E04B 2/7425 40/605 |
| 5,537,766 | A | * | 7/1996 | Nickens | G09F 15/0068 160/135 |
| 6,871,465 | B2 | * | 3/2005 | LaBruzza | F16B 5/0008 52/36.1 |
| 8,020,328 | B2 | * | 9/2011 | Lavi | A47B 47/0016 40/605 |
| 2012/0036755 | A1 | * | 2/2012 | Frey | G09F 15/0012 40/729 |

* cited by examiner

*Primary Examiner* — Joanne Silbermann
(74) *Attorney, Agent, or Firm* — Mohr Intellectual Property Law Solutions, PC (57) ABSTRACT

Modular interlocking display systems including frames constructed from a plurality of modular frame elements. The modular frame elements each include a perimeter side equipped with a locking channel and interlocking mechanisms that allow frames to be joined together without the need of tools. Frames constructed from the modular frame elements include one or more display sides that are orthogonal from the perimeter sides and equipped to receive and hold silicone-edged display material flush to the display side. In some examples, display systems includes additional corner frame elements that allow frames to be secured at right angles, allowing display systems accommodate complex configurations. In some further examples, display systems include adjustable angle elements to allow display systems to position frame walls at arbitrary angles. In still further examples, display systems include adapter elements to allow display systems to integrate with third-party display systems.

11 Claims, 9 Drawing Sheets

MODULAR INTERLOCKING DISPLAY SYSTEMS

BACKGROUND

The present disclosure relates generally to display systems useable to construct temporary displays. In particular, display systems that use a series of modular interlocking components with quick connect features that allow for fast and easy erection are described.

Many business sectors hold trade shows at various times and in various cities in any given year. Companies that wish to exhibit at trade shows typically must provide furnishings for their allotted exhibition booth or space, and can benefit from professional and polished displays to present their products and/or services in the best light. High-end display systems may include ample display space for promotional materials, as well as lighting and electrical power for various accessories and displays.

These display systems nevertheless must be designed to be relatively easy to construct and tear down, preferably within a day or so, to accommodate trade show schedules. Moreover, these systems must be able to be torn down into portable units, to allow them to be moved from trade show to trade show, or stored when not in use. Because the needs of any given vendor can vary almost infinitely, display systems must be capable of a wide variety of configurations. Thus, a modular approach to display system components is preferable, as it enables the creation of an almost infinite variety of display systems from a handful of standard components.

Known display systems are not entirely satisfactory for the range of applications in which they are employed. For example, existing display systems often have complex assembly processes, which require a number of tools. Complex assembly processes increase the time and cost associated with assembly of existing display systems. In addition, conventional systems are not always ideal for the display of large graphic assets. Display frame components, like any building system, have finite span lengths, and frame members located within display wall spans typically require large graphic assets to span multiple panels, which makes achieving a seamless graphic appearance problematic.

Thus, there exists a need for modular interlocking display systems that improve upon and advance the design of known display systems. Examples of new and useful modular interlocking display systems relevant to the needs existing in the field are discussed below.

Disclosure addressing one or more of the identified existing needs is provided in the detailed description below. Examples of references relevant to the disclosed modular interlocking display systems include U.S. Pat. No. 6,871,465 (the '465 patent). The '465 patent is directed to a locking clip that is placed in or on locking channels of modular display systems, and is designed to mate with identical clips placed on or in opposing channels to lock adjoining panels of modular display systems into place. The complete disclosures of the above patents and patent applications are herein incorporated by reference for all purposes.

SUMMARY

The present disclosure is directed to modular interlocking display systems that include a first frame and second frame constructed from a plurality of modular frame elements. The modular frame elements each include a perimeter side equipped with a locking channel and one or more interlocking mechanisms that allow the first frame and second frame to be joined together without the need of tools. Frames constructed from the modular frame elements include one or more display sides that are orthogonal from the perimeter sides and equipped to receive and hold silicone-edged display material flush to the display side. In some examples, display systems includes additional corner frame elements that allow frames to be secured at right angles, allowing display systems accommodate complex configurations. In some further examples, display systems include adjustable angle elements to allow display systems to position frame walls at arbitrary angles. In still further examples, display systems include adapter elements to allow display systems to integrate with third-party display systems.

DETAILED DESCRIPTION

The disclosed interlocking display systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various interlocking display systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-5B, a first example of a system for constructing interlocking displays, display system 100, will now be described. Display system 100 functions to provide a modular display system constructed from a small number of interlocking frame elements, but is capable of a vast array of possible configurations. The reader will appreciate from the figures and description below that display system 100 addresses shortcomings of conventional modular display systems.

For example, display system 100 can easily be constructed with minimal to no tools. The basic frame elements can be securely attached and detached using no tools, simply by sliding the components until a lock is achieved. Further, display system 100 includes an improved profile for mounting large, multi-panel graphic assets. Components of a multi-panel graphic can mount flush into the various frame elements, so as to minimize visual disruption of large graphics.

Display system 100 includes a first frame and second frame constructed from a plurality of modular frame elements 101. As will be discussed in greater detail below, the first frame detachably connects to the second frame by one or more interlocking mechanisms positioned within a locking channel positioned on the perimeter sides of each frame. In other examples, display system 100 includes additional or alternative features, such as additional system elements that include a corner frame element 120, adapter element 140, or adjustable angle element 160, to which frames constructed from modular frame elements 101 can removably attach to create a variety of display configurations. It should be understood that a given display system 100 may be comprised of multiple frames and a variety of constituent elements.

Figure 1A:
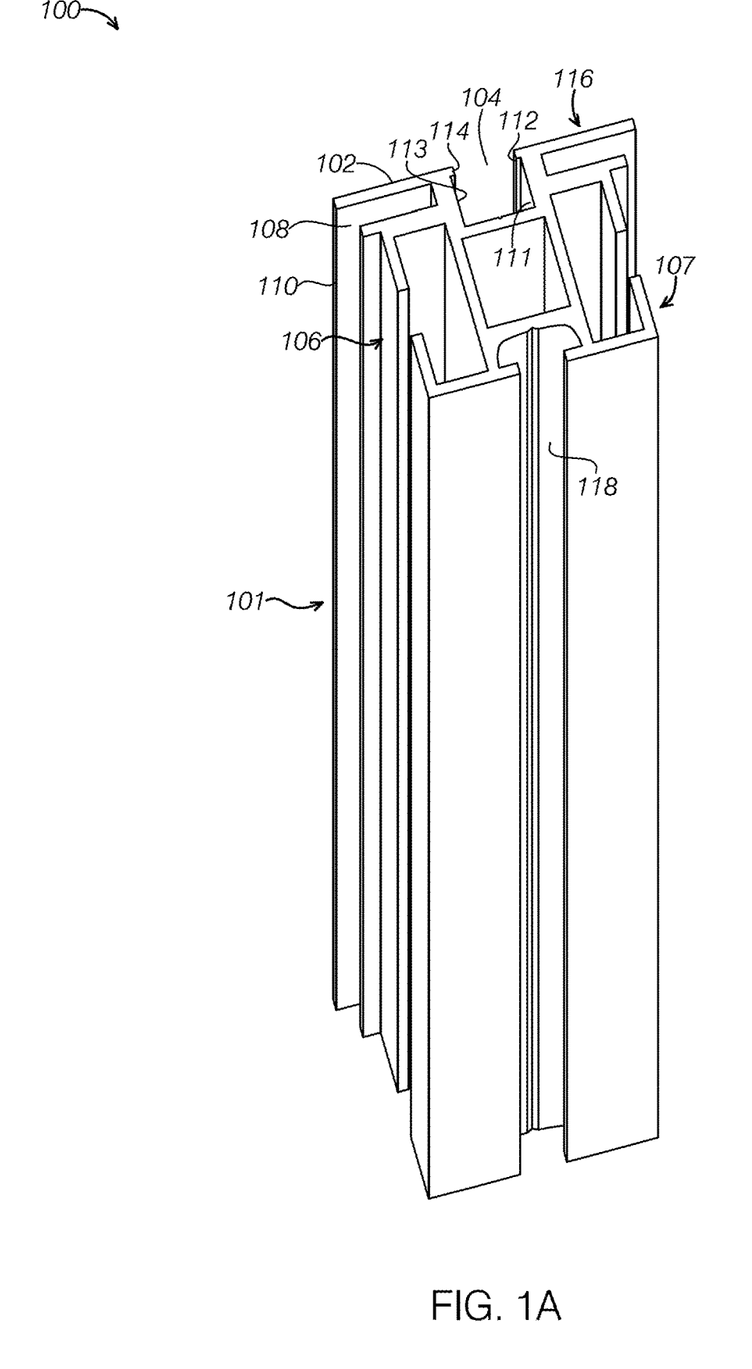
FIG. 1A is a perspective view of a first example of an interlocking display modular frame element.
Figure 2A:
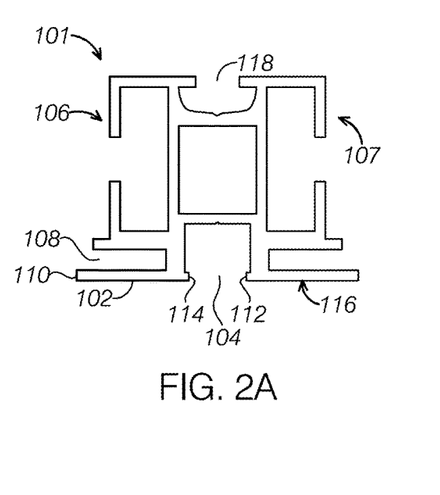
FIG. 2A is a cross-sectional view of the interlocking display modular frame element shown in FIG. 1A.

As can be seen in FIGS. 1A and 2A, each modular frame element 101 comprises a perimeter side (or face) 116, that includes a perimeter surface 102 and a locking channel 104 with a first side 113 and second side 111. Locking channel 104 extends back, preferably orthogonally, from perimeter surface 102, and is preferably defined by a first flange 114 and second flange 112 that protrude orthogonally from first side 113 and second side 111, respectively, and are extensions from perimeter surface 102. As can be seen in the figures, locking channel 104 preferably bisects perimeter surface 102 and by extension, perimeter side 116.

A display side 106 is orthogonal to perimeter side 116 and includes a display material channel 108 extending back from display side 106. Flange 110 extends transversely from first side 113 of locking channel 104 and forms at least part of the surface of perimeter surface 102, with flange 110 forming the outer wall of display material channel 108. Although not numbered in the figures, it can be seen that modular frame element 101 possesses two display sides, with a second display side 107 being located on the opposite side from display side 106. Preferably, display sides 106 and 107 are configured identically, although modular frame element 101 could possess a differently configured second display side 107 depending upon the needs of the user of display system 100.

Perimeter side 116, with its various features described above, constitutes the primary locking mechanism for display system 100, and as will be seen below, all the various elements of display system 100 include a perimeter surface 116 that is configured identically, and designed to removably secure to other perimeter surfaces 116. Modular frame element 101 further optionally includes third party system channel 118. In the example depicted in FIGS. 1A and 2A, channel 118 is designed to interface with MODUL display systems, and is located opposite perimeter surface 116. Channel 118 could also be configured to interface with other types of systems, or could further be implemented as multiple channels or other features so as to mate with any of a number of different third party or auxiliary systems or accessories.

Modular frame element 101 is preferably manufactured from aluminum, via an extrusion process. Modular frame element 101 can be manufactured in a variety of sizes and arbitrary lengths depending upon the needs of users of display system 100. However, modular frame element could be manufactured from materials other than aluminum, such as different types of metal, plastic, wood, composites, a combination of the foregoing, or any other suitable material now known or later developed, and using different manufacturing methods other than extrusion.

Display frames that make up the panels or frames of display system 100 are formed from a plurality of modular frame elements 101. In the preferred embodiment, modular frame elements 101 are cut to size with ends angled at 45 degrees. The angle ends are abutted so as to form a rectangular frame. The modular frame elements are then secured at their ends to each other using brackets or clamps that are well known in the art to form a rigid rectangular frame, with a perimeter side 116 forming the entire perimeter of the frame.

Figure 1B:
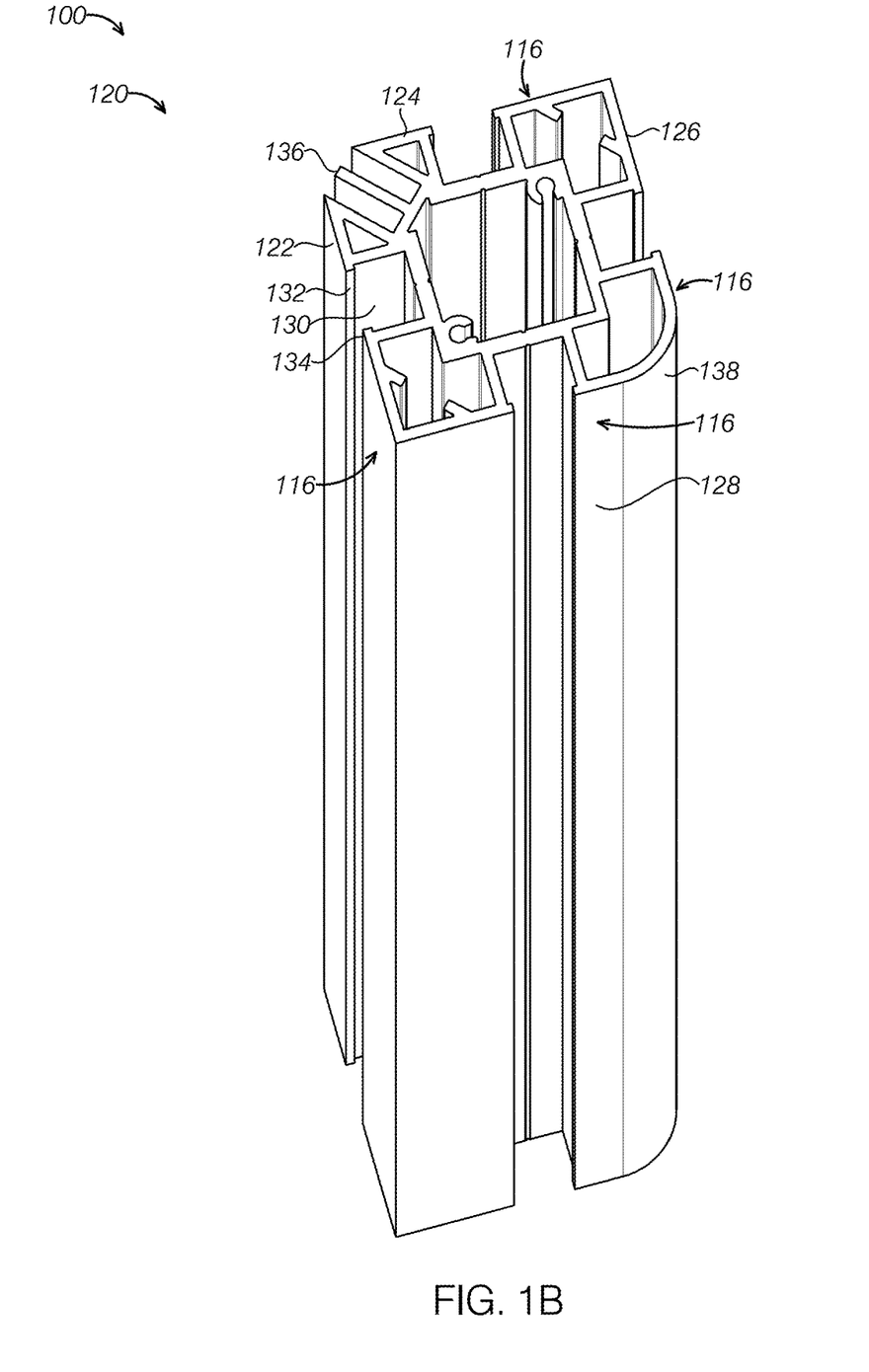
FIG. 1B is a perspective view of a first example of an interlocking display corner frame element.
Figure 2B:
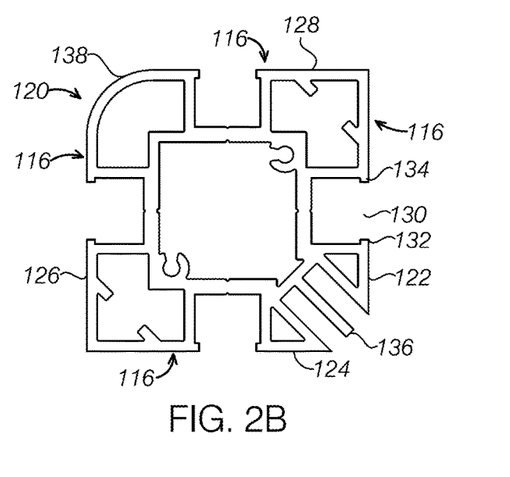
FIG. 2B is a cross-sectional view of the interlocking display corner frame element shown in FIG. 1B.

In the example shown in FIGS. 1B and 2B, corner frame element 120 is depicted. Corner frame element 120 preferably includes four perimeter sides 116 that are configured identically to perimeter side 116 that is part of modular frame element 101. Thus, each perimeter side 116 includes a surface 122, which is bisected with a locking channel 130. Locking channel 130 is defined by two sides that extend orthogonally from surface 122, and is rimmed by a first flange 132 and second flange 134, each of which are lateral extensions from surface 122.

As can be seen in FIGS. 1B and 2B, the corners of corner frame element 120 preferably differ, to provide options in construction appearance of display system 100. Surface 122 and surface 124, orthogonal to surface 122, are divided by one or more corner fins 136, while surface 126 and surface 128, orthogonal to surface 126, are divided by rounded corner 138. While corner frame element 120 is depicted as substantially square, it should be understood that corner frame element 120 could be configured in a variety of polygonal shapes, such as a triangle, pentagon, hexagon, octagon, or any other similar shape, to further expand the range of possible configurations for display system 100. Furthermore, corner frame element 120 could optionally be equipped with one or more sides equipped with a channel features similar to third party system channel 118 for connecting third party display frame systems. Corner frame element 120 is manufactured from the same materials and techniques as modular frame element 101.

Figure 1C:
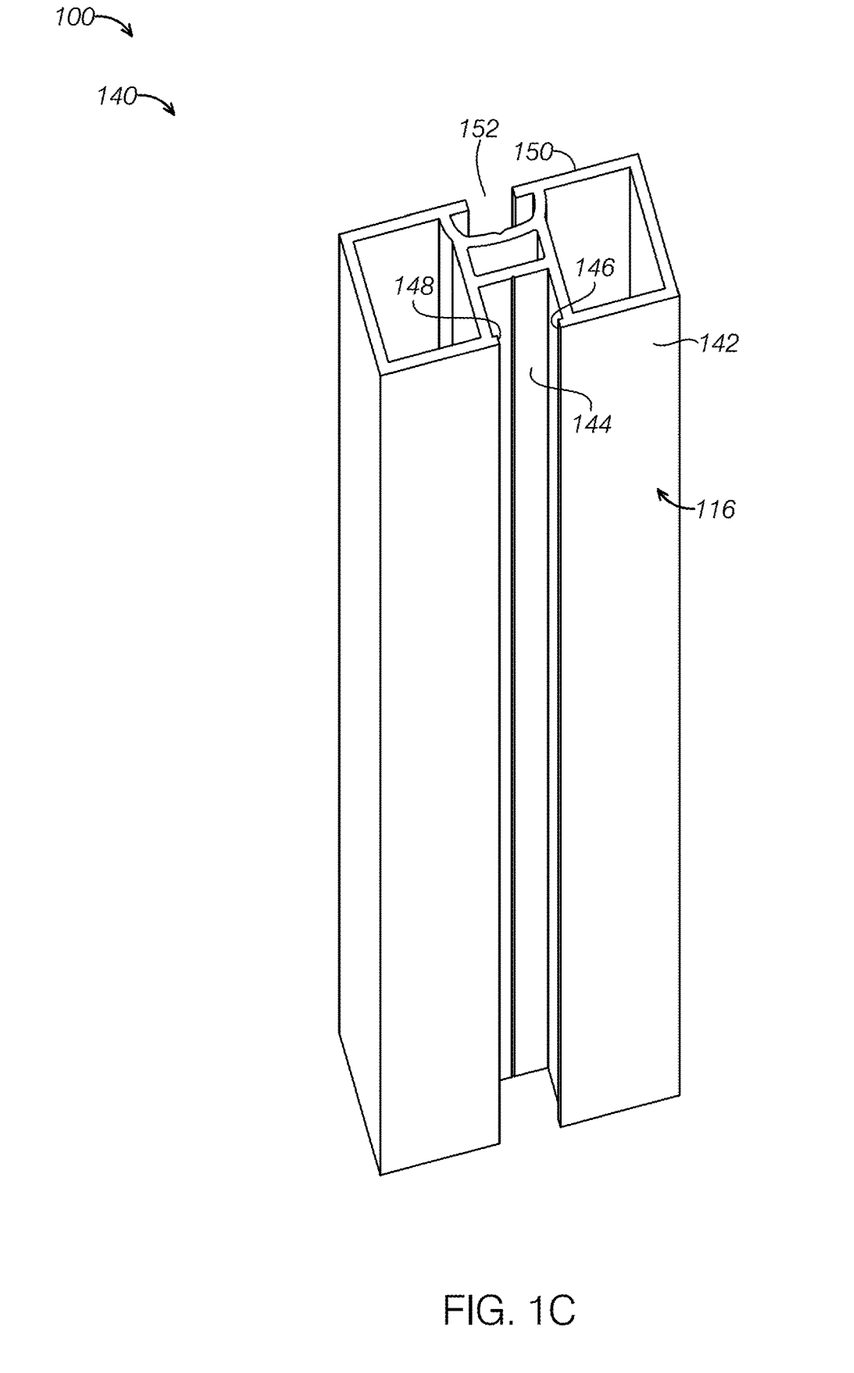
FIG. 1C is a perspective view of a first example of an interlocking display adapter element.
Figure 2C:
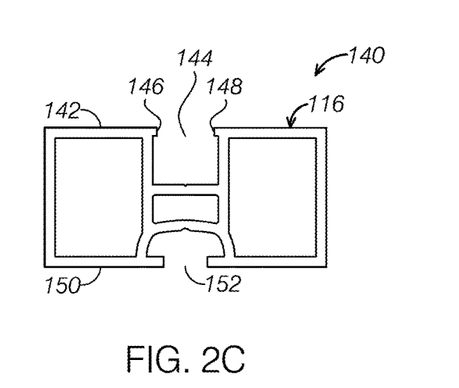
FIG. 2C is a cross-sectional view of the interlocking display adapter element shown in FIG. 1C.

Turning to FIGS. 1C and 2C, adapter element 140 is depicted. In its preferred embodiment, adapter element 140 includes a single perimeter side 116, which is disposed opposite to adapter side 150. Perimeter side 116 is configured identically to the corresponding perimeter sides 116 on modular frame element 101 and corner frame element 120. As such, perimeter side 116 includes a perimeter surface 142 that is bisected by a locking channel 144, which extends away orthogonally from perimeter surface 142. Perimeter surface 142 preferably extends to form a flange on either of sides 146 and 148 of locking channel 144. Adapter side 150 includes a third party system channel 152, configured in a similar fashion and with similar possible variants as channel 118 on modular frame element 101.

In addition to functioning as a mount point for third party display systems and associated components, adapter element 140 could be used as an end cap to a frame constructed from a plurality of modular frame elements 101. Adapter element 140 can be constructed from similar materials and using similar manufacturing techniques as modular frame element 101 and corner frame element 120.

Figure 1D:
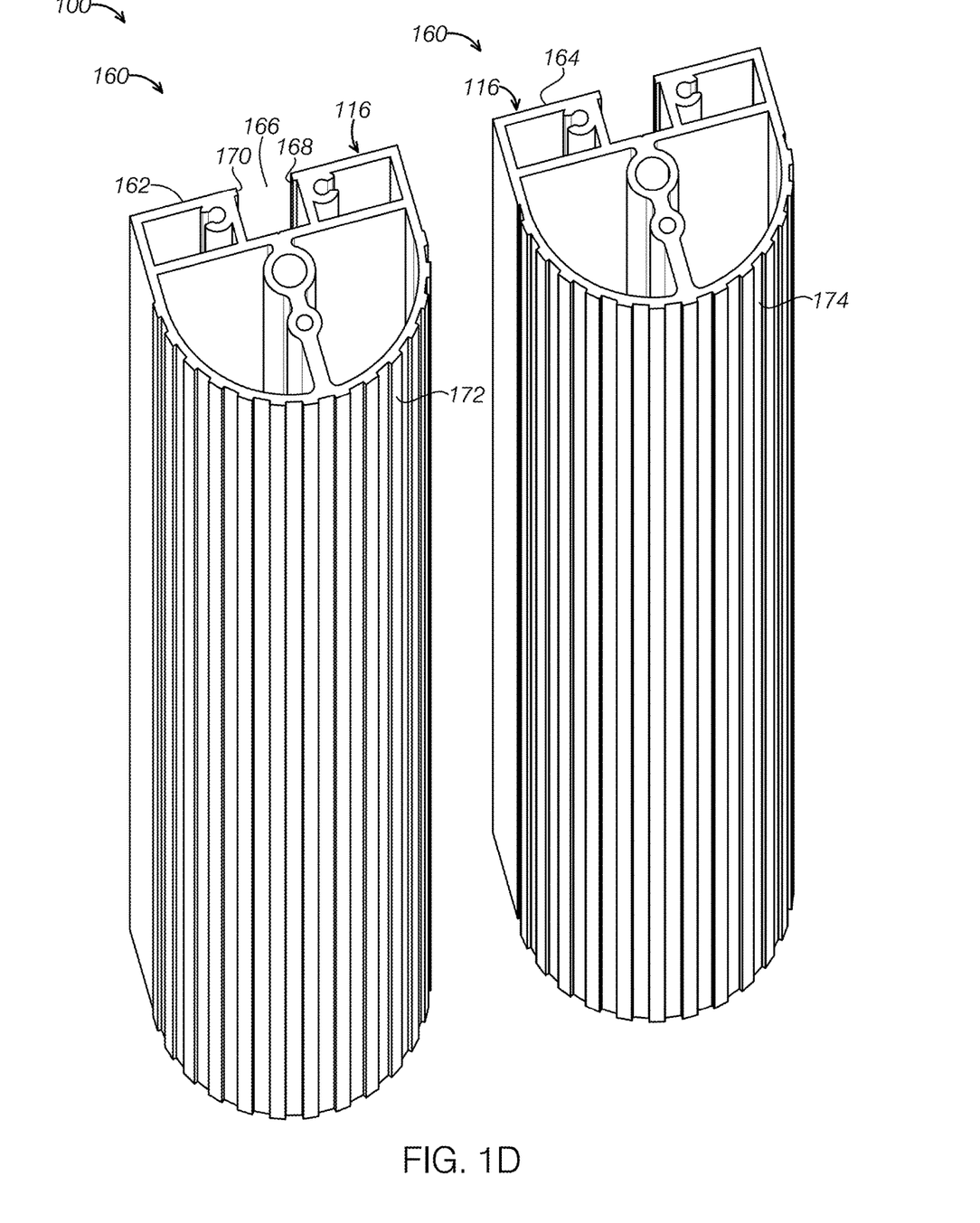
FIG. 1D is a perspective view of a first example of an interlocking display adjustable angle element.
Figure 2D:
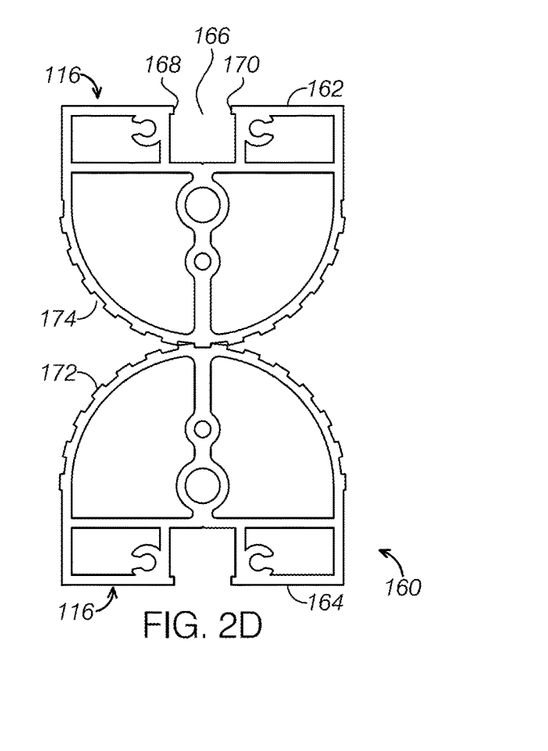
FIG. 2D is a cross-sectional view of the interlocking display adjustable angle element shown in FIG. 1D.

Referring now to FIGS. 1D and 2D, an adjustable angle element 160 is shown. Adjustable angle element 160 includes two portions, each including a perimeter side 116. Perimeter side 116 is configured identically to the perimeter sides 116 found on modular frame element 101, corner frame element 120, and adapter element 140. As such, perimeter side 116 includes a perimeter surface 162, which is bisected by a locking channel 166. Locking channel 166 is defined by a first side 168 and second side 170, each of which preferably is capped with a flange extending slightly into locking channel 166, and that are extensions of perimeter surface 162.

Extending from either side of perimeter surface 162 is a rounded angle adjusting surface 174 that possesses a series of lands and grooves. Adjusting surface 174 mates to a substantially identical rounded angle adjusting surface 172 that extends from either side of perimeter surface 164, which possesses a series of lands and grooves that correspond to and mirror the lands and grooves on adjusting surface 174. The interaction of the mating lands and grooves on adjusting surfaces 172 and 174 allows the angle between planes that run through perimeter surfaces 162 and 164 to be adjusted from being substantially parallel, as shown in FIG. 2D, to approximately 90 degrees.

Adjustable angle element 160 can be manufactured using the same materials and manufacturing techniques used for modular frame element 101, corner frame element 120, and adapter element 140. As can be seen in FIG. 1D, adjustable angle element is manufactured from two substantially identical extrusions that can be attached at either end using a suitable bracket to retain the two extrusions such that adjusting surface 172 and adjusting surface 174 remain mated, with the corresponding lands and grooves locked together. It should be appreciated that using lands and grooves is one possible implementation. Any configuration capable of allowing adjustable angle element 160 to vary the angle between its two perimeter sides 116 in a stable fashion may be utilized.

Figure 3A:
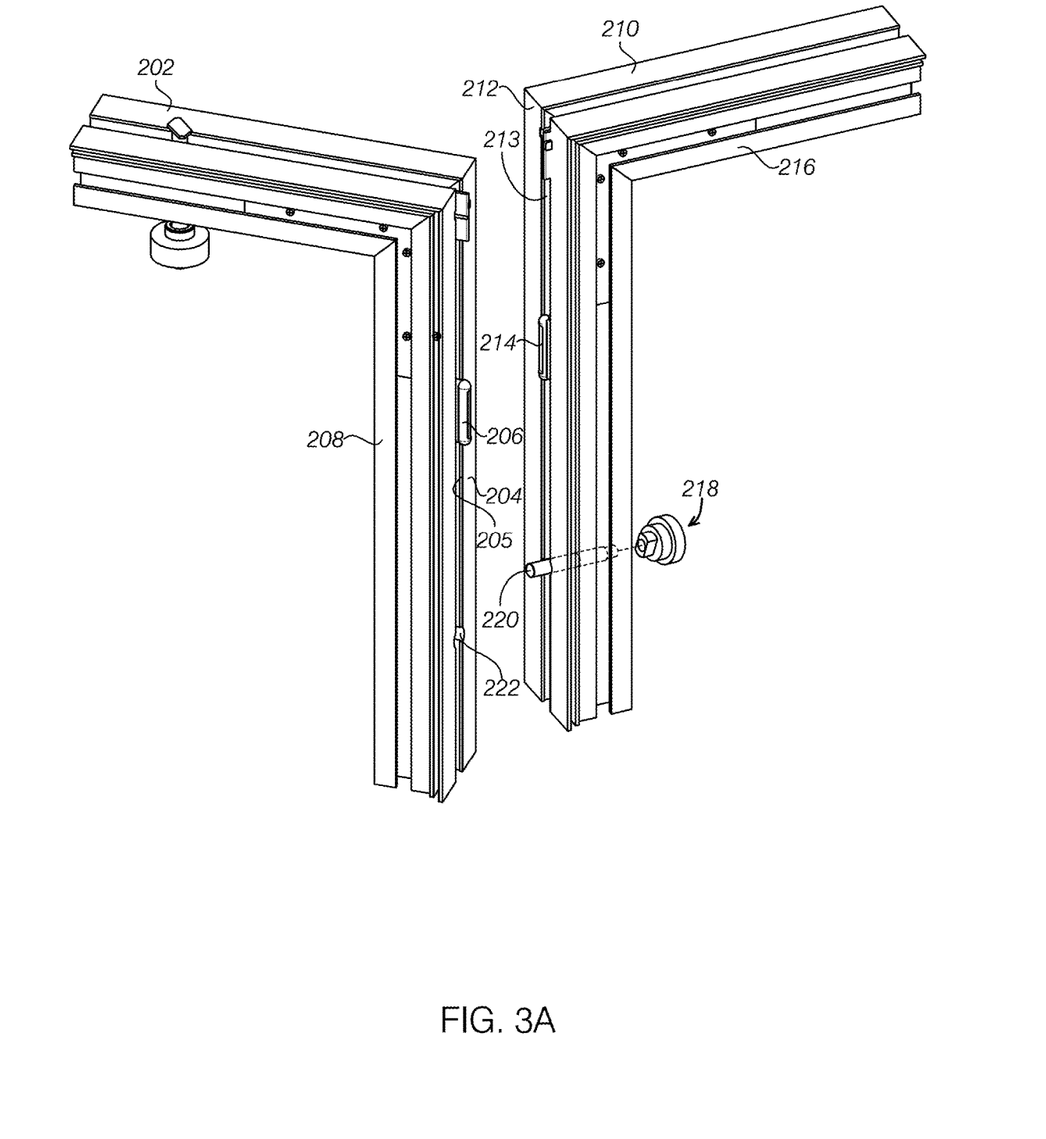
FIG. 3A is a perspective view of two interlocking display frames constructed from the modular frame elements shown in FIG. 1A, depicting the connection mechanisms.
Figure 3B:
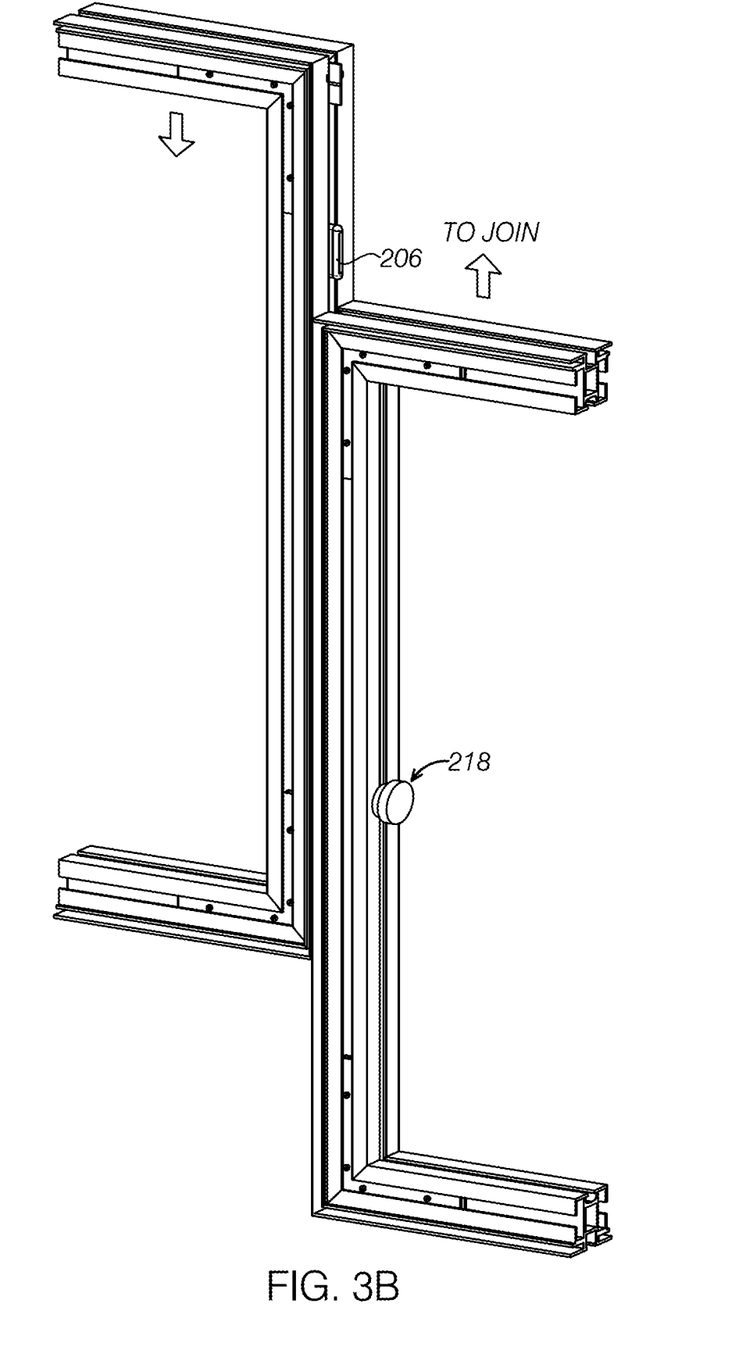
FIG. 3B is a perspective view of two interlocking display frames constructed from the modular frame elements shown in FIG. 1A, depicting the motion for how the display frames are joined on their sides.

As described above, modular frame elements 101 form the basis for the construction of display frames. FIGS. 3A and 3B depict the various components and ways in which display frames can be interlocked to construct a display system 100. A first frame 202 is constructed from modular frame elements 101 includes a first perimeter surface 204, which is configured to mate and lock to a second perimeter surface 212, that is part of a second frame 210. First perimeter surface 204 possesses a locking channel 205 which bisects surface 204. Within locking channel 205 is placed one or more interlocking mechanisms 206. Similarly, second perimeter surface 212 includes a bisecting locking channel 213, into which is inserted one or more interlocking mechanisms 214. First frame 202 includes at least one display surface 208, and second frame 210 includes at least one display surface 216.

Interlocking mechanisms 206 and 214 are preferably comprised of one or more mechanisms that enable secure locking between first frame 202 and second frame 210, allow for easy assembly and disassembly, and ensure that the various frame components align correctly. One possible such mechanism could comprise clips which are designed to mate and interlock with other identical clips. Examples of such clips can be found in U.S. Pat. No. 6,871,465. In this way, a single type of clip can be used, with it mounting to its corresponding mate in other perimeter sides 116. However, any other mechanism that allows for the secure locking and ease of assembly/disassembly could be utilized, including latches, pin and socket mechanisms, quick releasing clamps, etc. The interlocking mechanisms can be manufactured from plastic, metal, wood, composites, or any other suitable material now known or later developed. Moreover, in some embodiments the interlocking mechanisms may be integrated with mechanisms to secure first frame 202 and second frame 210 together, or may be omitted entirely, where alignment of frame components is either not critical, can be accomplished with other mechanisms, or can be feasibly accomplished by hand.

The various elements of display system 100 should be designed with lengths that have a commonly divisible spacing between the interlocking mechanisms, so that placing two perimeter sides 116 facing each other will result in the one or more interlocking mechanisms being positioned to complementarily mate with each other.

FIG. 3B depicts how first frame 202 and second frame 210 attach and lock together when interlocking mechanisms are employed. The two perimeter sides are brought into contact with each other, but off-center, and one of the frames to slid into alignment with the other frame. As the two frames slide relative to each other, the interlocking mechanisms located within the locking channels on each perimeter side protrude through the locking channels on the corresponding opposite perimeter side, and then engage the corresponding interlocking mechanisms. It will be understood that the manner in which first frame 202 and second frame 210 engage may vary depending upon the interlocking mechanisms utilized. To detach first frame 202 from second frame 210, the steps are simply reversed. In some instances, the interlocking mechanisms may require the two frames to be rotated with respect to each other, instead of slid.

As should be appreciated, the common perimeter side configuration used for locking on the modular frame elements 101 allows first frame 202 and second frame 210 to be attached and detached without the need to use any tools. Likewise, the interlocking mechanisms are standard across all elements of display system 100, including corner frame elements 120, adapter elements 140, and adjustable angle elements 160. Thus, all components of a given display system 100, and thus, the entirety of display system 100, can be assembled quickly and without tools.

Also shown in FIG. 3A is a locking plunger mechanism that acts to temporarily secure first frame 202 and second frame 210 once attached. The locking plunger mechanism is comprised of a locking shaft 220 placed within one frame that mates into a corresponding recess 222 that is machined into the second frame. A knob 218 is attached to locking shaft 220 to allow locking shaft 220 to be retracted from recess 222 when the two frames are to be detached. Locking shaft 220 is preferably spring-loaded to be held within recess 222. When first frame 202 is brought into contact with second frame 210, locking shaft 220 is depressed. As first frame 202 slides into a locked position relative to second frame 210, locking shaft 220 aligns with corresponding recess 222, and is driven in to engage recess 222 via its spring. When first frame 202 is to be detached from second frame 210, knob 218 is pulled to disengage locking shaft 220 from recess 222.

Locking shaft 220 can be manufactured from materials such as metal, plastic, wood, composites, or any other suitable material that can withstand the forces imposed by the attaching and detaching action. A person skilled in the relevant art will understand that locking shaft 220 is only one possible way of securing frames together. Any mechanism that can act to temporarily fix two frames relative to each other could be utilized to secure two frames that have been attached.

Figure 4:
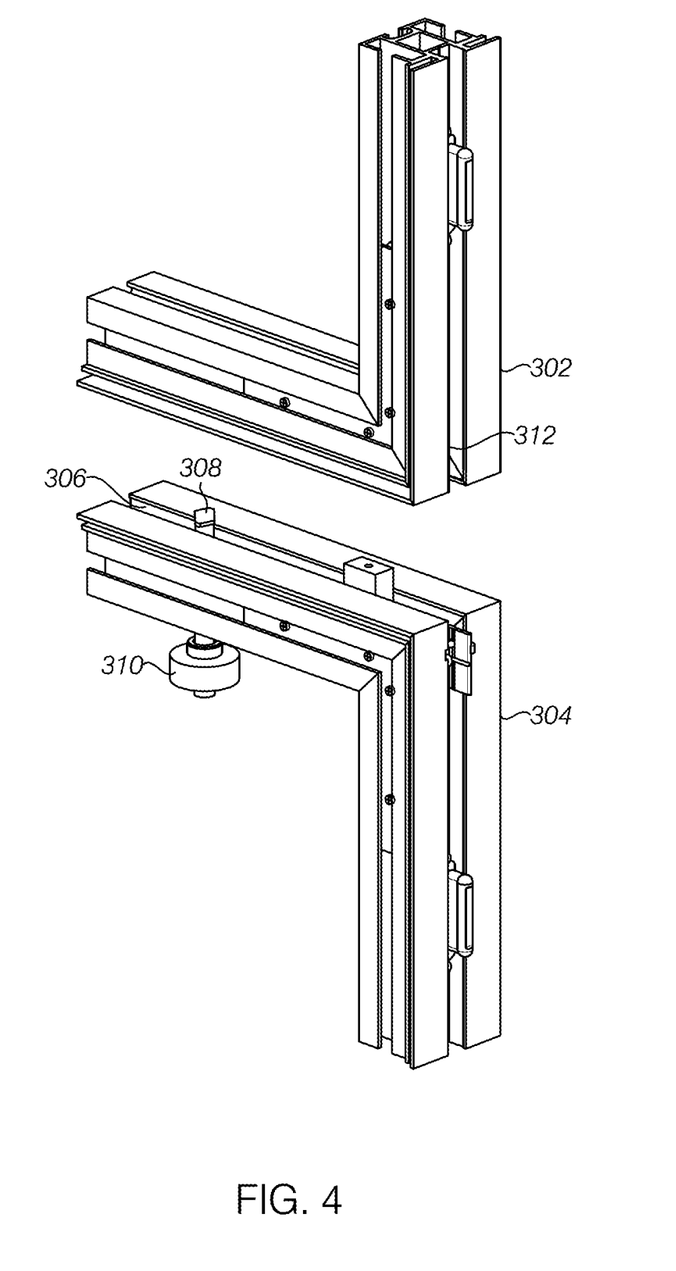
FIG. 4 is a perspective view of two interlocking display frames constructed from the modular frame elements shown in FIG. 1A, depicting the connection mechanisms for joining one frame to the top of another.

In addition to joining frames on their sides, frames in display system 100 can be stacked. FIG. 4 depicts first frame 302 and second frame 304 that are to be attached vertically, with a corresponding interlocking mechanism. In contrast to first frame 202 and second frame 210, the interlocking mechanism is only installed into second frame 304. The interlocking mechanism is comprised of a locking block 308, which is attached to a tensioning knob 310. Locking block 308 protrudes from locking channel 306, which bisects the top perimeter side of second frame 304. Likewise, first frame 302 includes locking channel 312, into which locking block 308 inserts. Locking channel 312 includes flanges around its opening, as depicted in the foregoing description of modular frame element 101 and its corresponding perimeter side 116.

To secure first frame 302 to second frame 304, their perimeter sides are brought together so that locking block 308 inserts into locking channel 312. As locking block 308 is rotated via tensioning knob 310, it engages with flanges protruding from either side of locking channel 312. As a user continues to rotate tensioning knob 310, it retracts down towards its locking channel 306, thereby placing pressure upon the flanges of locking channel 312, and drawing first frame 302 securely to second frame 304. First frame 302 can be detached from second frame 304 simply by reversing the process—rotating tensioning knob 310 so as to cause locking block 308 to raise and disengage from the flanges around locking channel 312. As with the other components of display system 100, locking block 308 can be manufactured from metal, plastic, wood, composites, or any other suitable material now known or later developed that can withstand the pressures exerted as tensioning knob 310 brings locking block 308 into engagement with locking channel 312.

Although the interlocking mechanisms used to secure the frames together are different between frames secured laterally versus frames secured vertically, it should be appreciated that a different type of interlocking mechanism could be employed that would be suited for use in attaching frames both laterally and vertically.

Figure 5A:
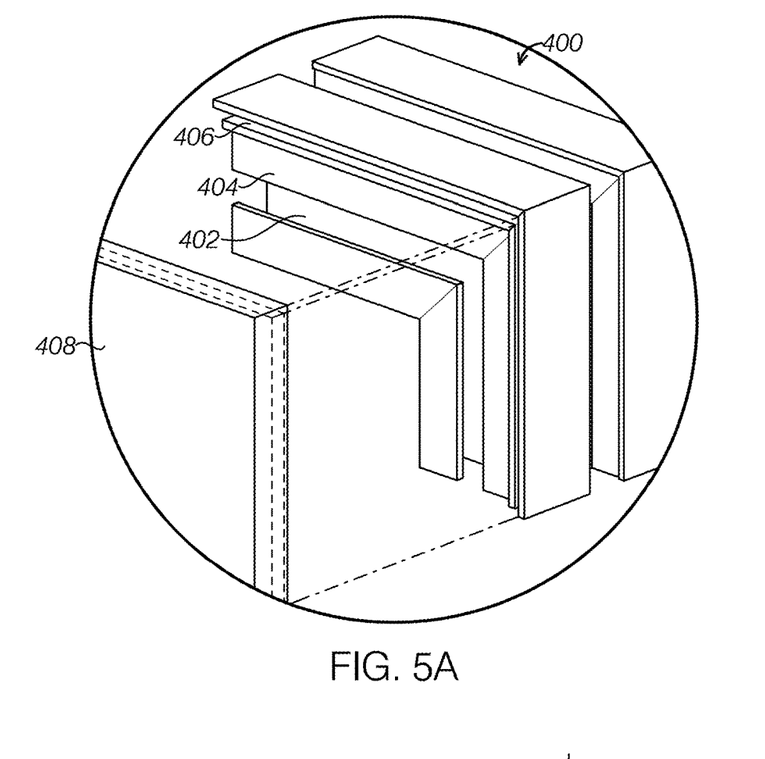
FIG. 5A is a perspective view showing how display material may be attached to an interlocking display frame constructed from the modular frame elements shown in FIG. 1A.
Figure 5B:
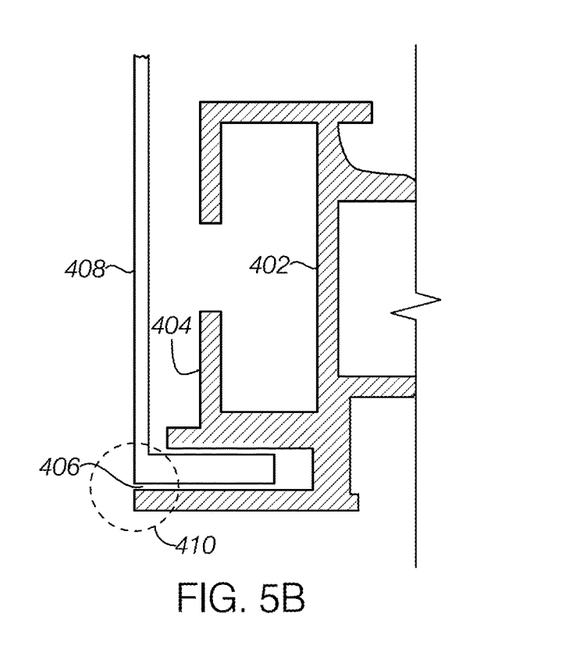
FIG. 5B is a cross-sectional view of a modular frame element shown in FIG. 1A depicting how display materials attach to the modular frame element.

Referring now to FIGS. 5A and 5B, the way in which display material 408 can be installed onto modular frame elements 101 when assembled into a frame 400 is depicted. Frame 400 includes a display material channel 406 which runs about the perimeter of frame 400 and is defined by edge of the frame's perimeter side 410. Extending inward from display material channel 406 are one or more mounting surfaces 404, which may be separated by an additional mounting channel 402.

Display material 408 is preferably silicone-edged material (SEM), that includes a firm but flexible outer perimeter that extends roughly orthogonally from the main plane of display material 408. This silicone edge is inserted into display material channel 406, where it is held secure and, when fully inserted, allows the surface plane of display material 408 to sit flush with the edge of perimeter side 410, as depicted in the dashed circle in FIG. 5B. In this way, interruptions between display panels are limited only to the widths of two edges of perimeter sides, and display material 408 sits smoothly upon the display frames.

Frame 400 can also be used for more rigid display panels and/or panels that are not silicone edged. For example, mounting surface 404 can be equipped with hook material positioned to receive loop material placed upon the back of display material 408. Similarly, additional mounting channel 402 can be used for still other types of display material that is suitably shaped to be secured into additional mounting channel 402.

Although fixed display material is discussed above, display system 100 is ideally constructed from materials that are sufficiently rigid to support lighting and electronic display technology, such as flat screen panels. Furthermore, although not depicted in the figures, the various elements of display system 100 can be equipped with channels and passageways that allow electrical cabling to be installed within the display system frames, so as to provide power along with data and audio/video communications throughout display system 100.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:
1. A system, comprising:
a first frame comprising a first modular frame element, wherein the first modular frame element comprises:
a first display side comprising a first display channel and a second display channel, wherein:

the first display channel extends back from a first portion of the first display side and is shaped to receive a first display material; and the second display channel extends back from a second portion of the first display side and is shaped to receive a second display material;

a locking side orthogonal to the first display side and comprising a locking channel extending back from the locking side; wherein the locking channel is configured to receive an a first interlocking mechanism integrated into the locking side, wherein the first interlocking mechanism is configured to connect the first frame to a second frame;

a first knob connected to a first locking shaft configured to attach to a first recess of a second frame;

a second display side comprising a third display channel and a fourth display channel, wherein:

the third display channel extends back from a first portion of the second display side and is shaped to receive the first display material; and the fourth display channel extends back from a second portion of the second display side and is shaped to receive the second display material, wherein the second display side is orthogonal to the locking side;

the second frame, comprising:

a second modular frame element;

a second interlocking mechanism integrated into the second modular frame element, wherein the second interlocking mechanism is configured to connect the second frame to the first frame; and a second knob connected to a second locking shaft configured to attach to a second recess of the first frame, wherein the first frame is configured to detachably connect to the second frame by the first interlocking mechanism, the first knob and first locking shaft, the second interlocking mechanism, and the second knob and second locking shaft, when the interlocking mechanism is positioned within the locking channel of the first frame.

2. The system of claim 1, further comprising the first display material, wherein at least a part of the first display material inserted into and retained by the first display channel is retained flush with an edge of a first flange that extends transversely from the first display side of the first display channel and forms at least part of a surface of the first display side, the first flange forming a wall of the first display channel.

3. The system of claim 1, further comprising the second display material, wherein at least a portion of the second display material inserted into and retained by the second display channel is retained flush with an edge of a second flange that extends transversely from the second display side of the second display channel and forms at least part of a surface of the second display side, the second flange forming a wall of the second display channel.

4. The system of claim 1, wherein:

a first side of the locking channel comprises a first locking flange that extends partially into the first side of the locking channel; and a second side of the locking channel comprises a second locking flange that extends partially into the second side of the locking channel, wherein the first locking flange and the second locking flange are sized to engage at least a portion of the first interlocking mechanism.

5. The system of claim 1, wherein the first frame detachably connects to the second frame by:

positioning the locking side of the first frame against the locking side of the second frame; and sliding the first frame relative to the second frame to position the first interlocking mechanism within the locking channel of the first frame and the second frame.

6. The system of claim 5, wherein the first interlocking mechanism comprise a locking clip.

7. The system of claim 1, wherein the first modular frame element further comprises a third party channel disposed opposite the locking side, the third party channel being shaped to receive a third party frame system component.

8. A system, comprising:

a first modular frame further comprising:

a first display face comprising:

a first display channel disposed upon and extending back from a first portion of the first display face so as to bisect a first portion of the first display face and receive a first display material; and a second display channel disposed upon and extending back from a second portion of the first display face so as to bisect a second portion of the first display face and receive a second display material;

a locking face orthogonal to the first display face and comprising a locking channel extending back from the locking face, wherein the locking channel is configured to receive an interlocking mechanism to connect the first modular frame to a second modular frame;

the interlocking mechanism integrated into the locking face, wherein the interlocking mechanism is configured to connect the first modular frame to a second frame;

a first knob connected to a first locking shaft configured to attach to a first recess of a second modular frame;

a second display face comprising:

a third display channel extending back from a first portion of the second display face so as to bisect the first portion of the second display face and receive the first display material; and a fourth display channel extending back from a second portion of the second display face so as to bisect the second portion of the second display face and receive the second display material, wherein the second display face is orthogonal to the locking face.

9. The system of claim 8, wherein the interlocking mechanism includes a locking clip.

10. The system of claim 8, further comprising the first display channel, wherein the first display channel is configured to retain display material substantially flush with an edge of the first display face.

11. The system of claim 8, further comprising the second modular frame that is configured to removably attach to the first modular frame.

* * * * *